Nov. 1, 1927.

C. A. UPDEGRAVE ET AL 1,647,943

ATTACHMENT FOR WINDSHIELDS

Filed Feb. 3, 1927

INVENTORS
Clarence A. Updegrave
Warren R. Shollenberger,

Geo. F. Kimmel  ATTORNEY.

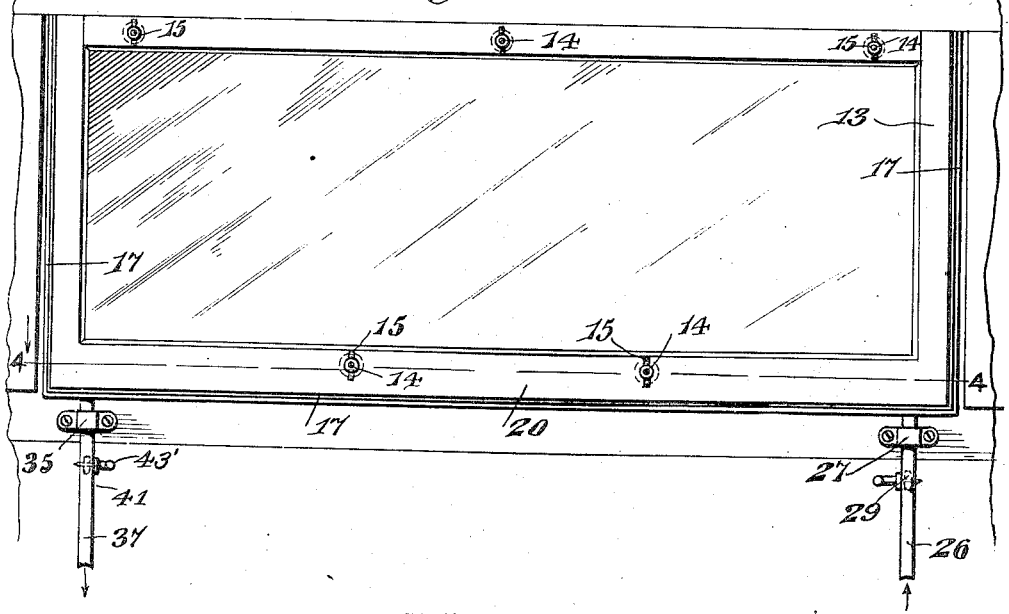
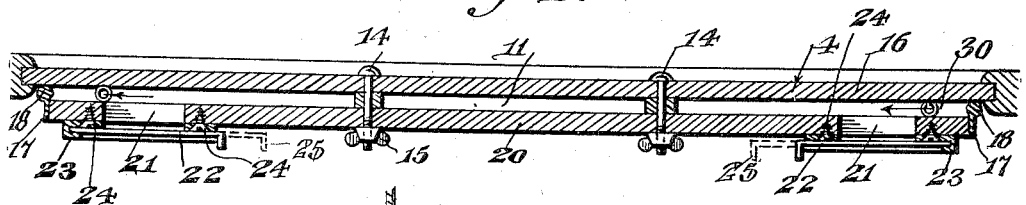
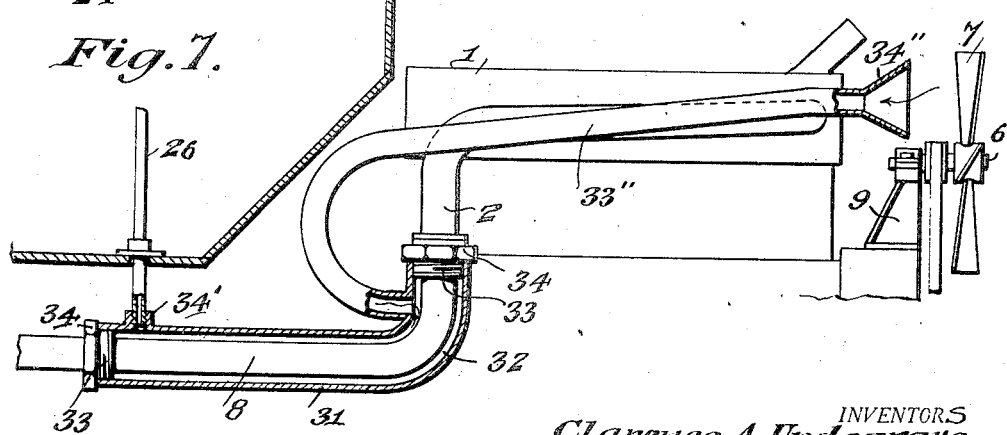

Patented Nov. 1, 1927.

1,647,943

UNITED STATES PATENT OFFICE.

CLARENCE A. UPDEGRAVE, OF ORWIGSBURG, AND WARREN R. SHOLLENBERGER, OF SCHUYLKILL HAVEN, PENNSYLVANIA, ASSIGNORS OF TWENTY PER CENT TO WILLET BOYER, OF POTTSVILLE, PENNSYLVANIA.

ATTACHMENT FOR WINDSHIELDS.

Application filed February 3, 1927. Serial No. 165,708.

This invention relates to a heating attachment for the wind shields of automobiles, and has for its object to provide, in a manner as hereinafter set forth, an attachment of the class referred to for maintaining the windshield at a temperature to prevent accumulation of frost and moisture thereon thereby enabling the driver of the vehicle to have a clear vision during the travel of the latter, under such conditions reducing possibility of accidents and collisions to a minimum.

A further object of the invention is to provide, in a manner as hereinafter set forth, an attachment of the class referred to constructed and arranged for the heating of air from the exhaust manifold of the engine and further for conducting the heated air to the wind shield of an automobile to prevent the accumulation of frost and moisture on the latter, and for discharging the heated fresh air, from the shield, into the car to provide a comfortable temperature therein.

Further objects of the invention are to provide, in a manner as hereinafter set forth, a heating attachment for the windshields of automobiles which is comparatively simple in its construction and arrangement, strong, durable, compact, thoroughly efficient in its use, readily installed with respect to the automobile and comparatively inexpensive to set up.

With the foregoing and other objects in view the invention consists of the novel construction, combination and arrangement of parts, as hereinafter more specifically described and illustrated in the accompanying drawings, wherein is shown embodiments of the invention, but it is to be understood that changes, variations and modifications can be resorted to which fall within the scope of the claims hereunto appended.

In the drawings wherein like reference characters denote corresponding parts throughout the several views:—

Figure 3 is a fragmentary view in front elevation, of an automobile showing the adaptation therewith of a windshield and the form of attachment illustrated in Figure 1.

Figure 4 is a longitudinal sectional view of a modified form of windshield.

Figure 7 is an elevation, partly in longitudinal section, of a modified form of heating attachment employed in connection with the modified form of windshield shown in Figure 4.

Figure 1:
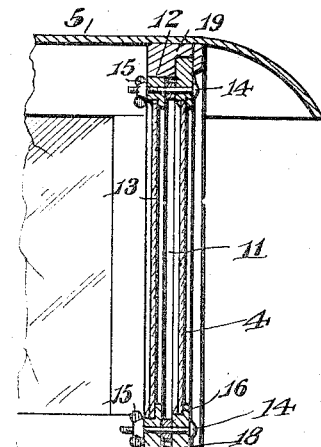
Figure 1 is a fragmentary view, in longitudinal section of an automobile, showing the adaptation thereof of a heating attachment, in accordance with this invention, for the windshield.

Referring to the drawings in detail 1 denotes the engine of an automobile, 2 the exhaust manifold of the engine, 3 the engine hood, 4 the windshield, 5 the body of the automobile, 6 the fan shaft, 7 the fan and 8 a discharge pipe extended rearwardly from the exhaust manifold 2. The foregoing elements are of known construction, with this exception that the fan shaft 6, is extended rearwardly from its bearing 9 and carries a drive pulley 10 for a purpose to be presently referred to.

Coacting with the windshield 4, as well as being fixedly secured thereto, for the purpose of forming a hot air receiving chamber 11, is a frame 12 of the same contour as the windshield 4 and which carries a transparent member 13 of the same size as the windshield glass. The frame 12 is positioned rearwardly with respect to the windshield 4 and is fixedly secured to the latter, by a series of spaced bolts 14, carrying wing nuts 15. Mounted on the bolts 14 and interposed between the frame 12 and windshield 4 are resilient spacing members or collars 16. The frame 12 has secured to the outer edge thereof, as well as being coextensive with the end and bottom edges thereof a strip of resilient material, indicated at 17, which projects forwardly of the frame 12 and has the projecting portion thereof enlarged, as at 18. The enlarged portion 18 of the strip 17, abuts against the windshield 4 and provides the lower and end wall of the chamber 11. The strip 17 further provides what may be termed a resilient sealing means between the opposed faces of the frame 12 and windshield 4. The top of the frame 12 abuts against the cross support 19 for the top of the windshield 4. The wing nuts 15 provide means for tightly clamping, in connection with the collars 16 and strips 17, the frame 12 to and rearwardly of the windshield 4.

Figure 2:
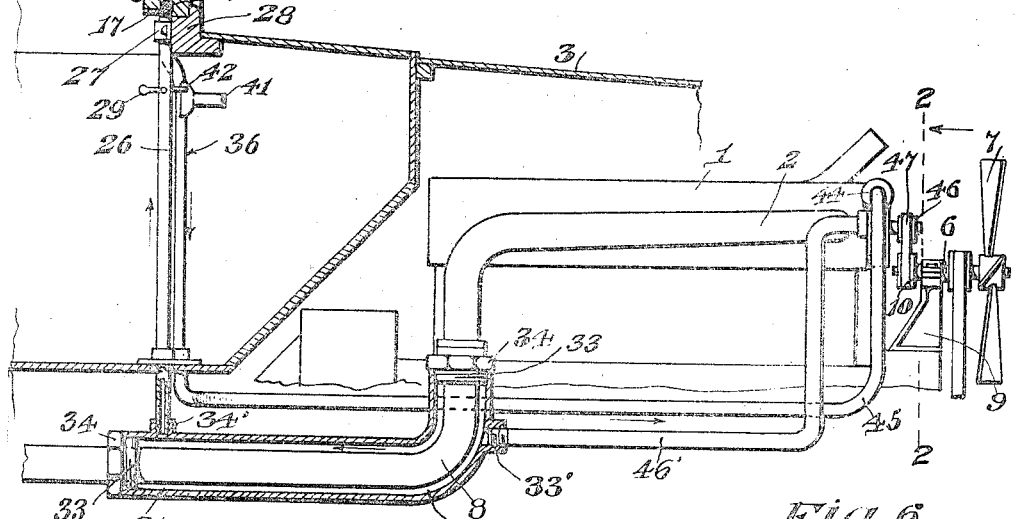
Figure 2 is a fragmentary view, in front elevation, taken on line 2—2 Figure 1.
Figure 5:
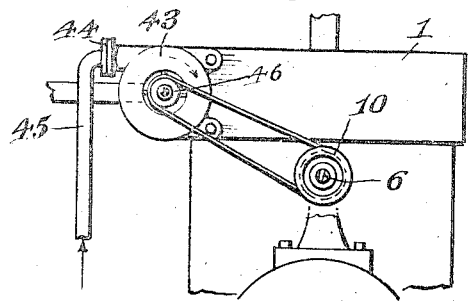
Figure 5 is a cross sectional view of the hot air conducting pipe illustrating the shut off valve therefor.
Figure 6:
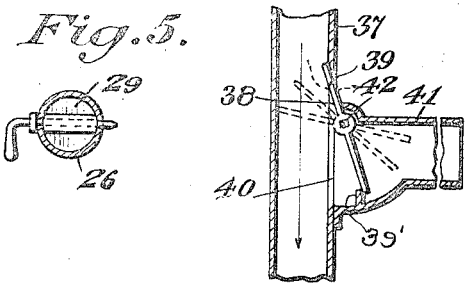
Figure 6 is a fragmentary view in vertical section, illustrating the valved controlled outlet and intake.

Referring to Figures 1 to 6, the heating attachment includes a heated air conducting pipe 26, which is vertically disposed and extends through a keeper 27 attached to the inner face of the lower support 28 for the windshield 4. The pipe 26 in proximity to its upper end and below the support 28 is provided with a manually operated controlling valve 29. The pipe 26 extends through the bottom portion of the strip 17 in proximity to one end thereof and opens into the chamber 11, as indicated at 30 and clearly shown in Figures 3 and 4. Surrounding the discharge pipe 8, as well as being connected therewith in any suitable manner and spaced therefrom is a tubular casing 31, forming in connection with the discharge pipe 8 an air heating chamber 32. By way of example the casing 31 is shown as having its inner face, at each end thereof, threaded for engaging with the coupling members 33 and these latter are flanged as at 34. The casing 31 abuts against the flanges 34 and the coupling members 33 provide means for closing each end of the chamber 32. As shown the discharge pipe 8 is of L-shaped contour and the casing 31 corresponds to the shape of the pipe 8. It is to be understood that the pipe 8 can be of any shape desired, but the casing 31 will conform to the shape of said pipe. The casing 31 at its forward end is provided with an intake nipple 33' for cool air and said casing 31 in proximity to its rear end and on its top is formed with an outlet nipple 34', to which the lower end of the hot air conducting pipe 26 is connected.

Secured to the rear face of the support 28 by the keeper 35 and leading from the chamber 11, is a pipe line referred to generally by the reference 36 and which acts as a hot air discharge pipe for the chamber 11 and further acts as a cool air intake pipe. The upper terminal portion of the line 36 is indicated at 37, and is formed with an outlet 38, which is controlled by a valve 39. The pipe line 36 below the outlet 38 is formed with a cool air inlet opening 40 with which communicates a cool air intake pipe 41 in which is arranged the valve 39. A stop 39' is provided for the valve 39 and which in connection with the latter closes the intake 40. The valve 39 is mounted on a pivot bar 42 which extends from the intake pipe 41 and carries a handle member 43', to provide for the manual operation or shifting or adjusting of the valve 39. The various positions of the valve 39 are illustrated in dotted lines in Figure 6. The pipe line 36 extends forwardly with respect to the conducting pipe 26 and opens into a suction device 43 as at 44. The shaft of the suction device is indicated at 45, and carries a pulley 46 which is operated from a belt 47 driven from the pulley 10. The suction device is supported from the forward end of the engine 1. The pipe line 36, not only provides means for the discharge of hot air from the chamber 11, as well as a cool air supply line, but further acts in connection with the suction device 43 as a suction pipe. Extended from the suction device 43 and connected to the nipple 33' is a cool air supply pipe 46' for the chamber 32. The circulation can be reversed by changing the direction of operation of the device 43.

By setting up the attachment with the conducting pipe 26, the pipe line 36, suction device 43, supply pipe 46' and with the pipes 26 and 46' communicating with the chamber 32 a circulation of hot air is had through the chamber 11 thereby heating the windshield in a manner to prevent the accumulation of frost and moisture thereon. The air supplied to the chamber 32 is heated from the exhaust from the engine 1 and the circulation of the hot air through the chamber 11, as well as the supply of cool air to the chamber 32 is carried on during the operation of the engine, due to the fact that the suction device 43 is operated from the fan shaft 6 on the travel of the automobile, or when the motor is in operation.

In the form shown in Figure 7 the pipe line 36 is dispensed with and the cool air is supplied to the chamber 32, by a supply pipe 33'', which extends forwardly from the casing 31 and is provided with a funnel-shaped opening 34'' for the reception of cool air directed by the fan 7. In the form shown in Figure 7 the suction device 43 is dispensed with as well as its operating means, when using the form illustrated in Figure 7, the modified construction of windshield shown in Figure 4 is employed. The windshield shown in Figure 4, is of the same construction as the form shown in Figure 3, with the exception that the bottom rail or member of the frame 12, which is indicated at 20, is formed with a pair of openings 21 controlled by ventilating slides 22, which are carried by casings 23 secured to the rear face of the bottom rail or frame member 20. The holdfast devices for securing the casings 23 in position are indicated at 24. The slides 22 normally close the openings 21 and are oppositely disposed with respect to each other and each of which is formed with an angularly disposed end 25 to facilitate the shifting the slide when desired. The openings 21 and slides 22 are provided so that the hot air from the chamber 11 can be discharged into the interior of the automobile for heating the car. Otherwise than that as stated, the form shown in Figure 7 is the same as that illustrated in Figure 1.

It is thought the many advantages of a heating attachment for windshields, in accordance with this invention can be readily understood, and although the preferred embodiments of the invention are as illustrated and described, yet it is to be understood that changes in the details of construction can be had which will fall within the scope of the invention as claimed.

What we claim is:

1. A heating attachment for the windshields of motor vehicles comprising a casing adapted to be connected with, surround and spaced from the discharge pipe of the motor of a vehicle and forming in connection with said pipe a cool air heating chamber, a pipe leading from said chamber to the windshield for conducting hot air to the latter to heat the same, a suction device adapted to be operated from the engine of the motor, a pipe line leading from the windshield to said device and provided intermediate its ends with a cool air intake and a heated air outlet, and a cool air supply line leading from said device to said chamber.

2. A heating attachment for the windshields of motor vehicles comprising a casing adapted to be connected with, surround and spaced from the discharge pipe of the motor of a vehicle and forming in connection with said pipe a cool air heating chamber, a suction device adapted to be operated from the engine of the motor, a pipe line leading from the windshield to said device and provided with a cool air intake and a heated air outlet and further provided with a valve common to said intake and outlet, and a cool air supply line leading from said device to said chamber.

3. A heating attachment for the windshields of motor vehicles comprising a casing adapted to be connected with and spaced from the discharge pipe of the motor of a vehicle and forming in connection with said pipe a cool air heating chamber, a valved controlled pipe leading from said chamber to the windshield for conducting hot air to the latter to heat the same, a suction device adapted to be operated from the engine of the motor, a pipe line leading from the windshield to said device and provided with right angularly disposed cool air intake and heated air outlet and a controlling valve common to said intake and outlet, and a cool air supply line leading from said device to said chamber.

4. A heating attachment constructed in accordance with claim 3, said chamber closed at each end, said conducting pipe communicating with said chamber in proximity to its rear end, and said cool air supply line communicating with said chamber in proximity to its forward end.

In testimony whereof, we affix our signatures hereto.

CLARENCE A. UPDEGRAVE.
WARREN R. SHOLLENBERGER.